United States Patent
Sanchez

(10) Patent No.: US 7,194,054 B2
(45) Date of Patent: Mar. 20, 2007

(54) MULTIMODE TERMINAL AND METHOD OF SYNCHRONIZING SUCH TERMINAL

(75) Inventor: Javier Sanchez, Rueil-Malmaison (FR)

(73) Assignee: NEC Corporation (JP)

( * ) Notice: Subject to any disclaimer, the term of this patent is extended or adjusted under 35 U.S.C. 154(b) by 781 days.

(21) Appl. No.: 10/372,371

(22) Filed: Feb. 24, 2003

(65) Prior Publication Data
US 2003/0224819 A1 Dec. 4, 2003

(30) Foreign Application Priority Data
Mar. 1, 2002 (FR) .................................. 02 02619

(51) Int. Cl.
 *H04L 7/00* (2006.01)
 *H04Q 7/20* (2006.01)
 *H04Q 7/00* (2006.01)
(52) U.S. Cl. .................. 375/356; 370/331; 455/436
(58) Field of Classification Search ................ 375/356, 375/354, 357; 455/552.1, 436, 553; 370/331, 370/465
See application file for complete search history.

(56) References Cited

U.S. PATENT DOCUMENTS 6,765,891 B2 * 7/2004 Laitinen et al. ............. 370/331
6,819,659 B1 * 11/2004 Palat et al. .................. 370/331
2004/0072578 A1 * 4/2004 Keutmann et al. ....... 455/456.1

* cited by examiner

*Primary Examiner*—Khai Tran
(74) *Attorney, Agent, or Firm*—Ostrolenk, Faber, Gerb & Soffen, LLP

(57) ABSTRACT

The invention relates to a multimode communication terminal comprising a first modulation/demodulation circuit adapted to communicate with a first radio access network and at least a second modulation/demodulation circuit adapted to communicate with a second radio access network different from the first radio network.

The terminal according to the invention comprises a synchronization module provided with means for determining a frequency difference between the first modulation/demodulation circuit and the first radio access network and means for synchronizing the second modulation/demodulation circuit with the second radio access network so as to allow said terminal to compare permanently transmission qualities over the first and second radio access networks.

21 Claims, 1 Drawing Sheet

MULTIMODE TERMINAL AND METHOD OF SYNCHRONIZING SUCH TERMINAL

BACKGROUND OF THE INVENTION

1. Field of the Invention

The invention is in the field of synchronizing the timing and frequency of a multimode terminal with at least two different base stations, and more specifically relates to a multimode communication terminal such as, for example, a dual-mode GSM-UMTS terminal (Global System for Mobile Communications and Universal Mobile Telecommunications System respectively), comprising a first modulation/demodulation circuit adapted to communicate with a first radio access network and at least a second modulation/demodulation circuit adapted to communicate with a second radio access network different from the first radio network.

The invention also relates to a method of evaluating transmission quality of a multimode terminal over at least two different radio access networks.

2. Description of the Related Art

Currently GSM is the mobile telephone system of reference in Europe and in the world. In order to ensure its evolution towards the third generation, international standardization organizations have proposed UMTS, technical specifications of which are developed under a partnership called 3GPP. One thing desired in the process of standardizing UMTS was to ensure its interoperability with GSM. Also, a specific classification describing four types of dual-mode terminals GSM/UMTS, Type 1, Type 2, Type 3, and Type 4 was established.

For terminals of Type 1, when a terminal is located in a radio GSM network or in a radio UTRA (for Universal Terrestrial Radio Access) network, the "inactive" radio part of the terminal (UTRA or GSM) does not perform any measurement of reception quality, with an implication that transition from one mode to the other cannot be made without intervention by the user.

For terminals of Type 2, when a mobile terminal is connected to a radio GSM network or to a radio UMTS network, the inactive radio part of the terminal (UTRA or GSM) may perform measurements in order to switch automatically to the network that provides the better reception quality.

Terminals of Type 3 are different from those of Type 2 in that they further provide the possibility of receiving information simultaneously in the two modes. On the other hand, simultaneous transmission in the two modes is not possible. As with terminals of Type 2, transition from one radio network to another takes place automatically.

For terminals of Type 4, transition from one radio network to another takes place automatically, and information may be received and transmitted simultaneously over the two networks.

Among the four types of terminals in this classification, it is the dual-mode terminals of Type 2 that are most common. These terminals allow the operators to make a profit from current investments in GSM, taking advantage of the existing coverage while familiarizing their subscribers with new services provided by UMTS.

At the level of functional architecture, a Type 2 terminal comprises an electronic card responsible for performing tasks specific to GSM and an electronic card that performs tasks specific to UMTS. In this type of terminal, at a given moment, one card is necessarily active and the other is inactive.

Consequently, at that moment, only communication with the network associated with the active card (GSM or UMTS) is possible. The inactive card can only perform measurements on neighboring cells belonging to the other radio access network (GSM or UMTS). The measurements possibly serve for switching automatically from a GSM network to a UMTS network and vice versa.

Recall that in a single-mode terminal (GSM or UMTS), in order to avoid relative frequency errors between the reference clock in the electronic card (GSM or UMTS) and the clock of the base station of the network (GSM or UMTS), it is necessary for the terminal to be synchronized with the associated network in time and frequency to be able to decode and then demodulate information coming from the base station. These errors may have several causes among which are variations of temperature or even aging of components of the terminal.

In order to compensate for these errors, a very common technique used in the prior art called AFC (Automatic Frequency Control) consists in ensuring frequency synchronization with the current base station to be as precise as possible with the aid of a closed loop that depends on a reference frequency value. The loop is supplied with estimations of frequency errors measured on the downlink channels that the mobile is listening.

In a Type 2 terminal with two electronic cards, GSM and UMTS, each having its own clock, synchronization between the two cards as well as between each card and the current cell presents a problem in that the AFC specific to respective cards may never converge because one of the cards is inactive for a very long period. But, one condition for AFC to converge is exactly that the terminal be able to read regularly information on those channels. Thus, when the mobile tries to perform measurements on surrounding cells, frequency errors will be such that taking of such measurements may not be accomplished.

The object of the invention is to resolve the inconveniences of the prior art described above.

SUMMARY OF THE INVENTION

The invention proposes a multimode communication terminal adapted to perform measurements, specifically of reception power, over a radio access network even when the terminal does not communicate over this network.

The terminal according to the invention comprises a first modulation/demodulation circuit adapted to communicate with a first radio access network and at least a second modulation/demodulation circuit adapted to communicate with a second radio access network different from the first radio network.

According to the invention, the terminal further comprises a synchronization module provided with means for determining a frequency difference between the first modulation/demodulation circuit and the first radio access network and means for synchronizing the second modulation/demodulation circuit with the second radio access network so as to allow said terminal to compare permanently transmission qualities over the first and second radio access networks.

In order to synchronize the second modulation/demodulation circuit with the second radio access network, the synchronization module determines the frequency difference between the first modulation/demodulation circuit and the first radio access network and calculates the frequency difference between the two modulation/demodulation circuits according to the offset determined.

According to the invention, the terminal further comprises a central unit designed to select the radio access network presenting the better communication quality.

According to an embodiment of the invention, the synchronization module comprises a first counter designed to count pulses of a clock associated with the first modulation/demodulation circuit and a second counter designed to count pulses of a clock associated with the second modulation/demodulation circuit.

In a first variation of the embodiment, the terminal comprises a first digital clock coupled to the first counter and a second digital clock coupled to the second counter.

In a second variation of the embodiment, the terminal comprises a first analog clock actuated and coupled to the first modulation/demodulation circuit through a first CNA and a second analog clock actuated and coupled to the second modulation/demodulation circuit through a second CNA.

In a specific application of the invention, the first radio access network is the GSM access network and the second radio access network is the UMTS access network.

The invention also relates to a method of evaluating transmission quality of the multimode terminal via each of the two radio access networks, comprising the following steps:

measuring a first frequency difference between the terminal and the active radio access network, estimating a second frequency difference between the active radio access network and the passive access network, deducing a third frequency difference between said terminal and the passive access network from the first and second frequency differences, using this third frequency difference to synchronize the terminal with the passive access network, evaluating the quality of the communication over the passive network, comparing the quality of the communication evaluated in the preceding step with the communication quality over the active access network, switching the link to the passive radio access network if this network presents a better communication quality than the active access network.

BRIEF DESCRIPTION OF THE DRAWINGS

Other characteristics and advantages of the invention will become apparent from the following description, to be taken as non-limiting an example with reference to the accompanying drawings in which.

DETAILED DESCRIPTION OF THE PREFERRED EMBODIMENTS

In the following description, reference will be made to a dual-mode mobile telephone comprising a modulation/demodulation circuit constituted by a first DSP signal digital processor that performs tasks of modulation and demodulation when the telephone is connected to the GSM network, and a second modulation/demodulation circuit constituted by a second DSP signal digital processor that performs tasks of modulation and demodulation when the telephone is connected to the UMTS network.

Figure 1:
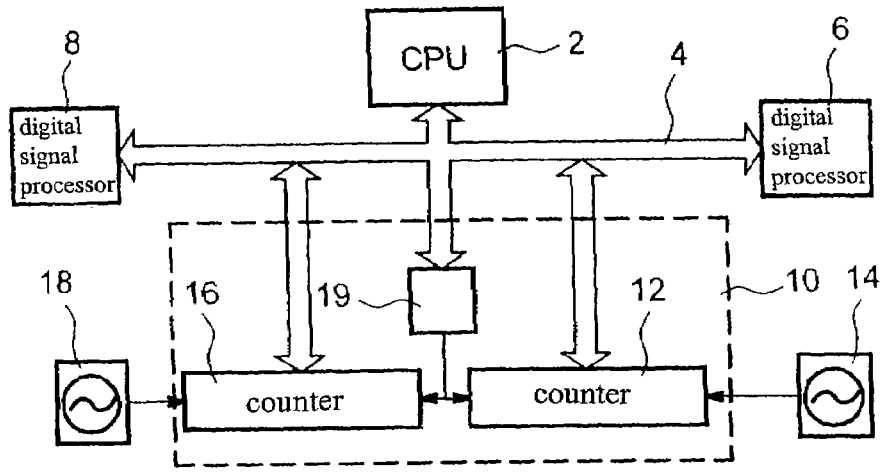
FIG. 1 represents schematically a first embodiment of a synchronization module implemented on a terminal according to the invention.

With reference to FIG. 1, the mobile telephone includes a central unit 2 coupled via a data bus 4 to the first DSP signal digital processor 6, to the second DSP signal digital processor 8, and to a synchronization module 10.

The synchronization module 10 is an electronic card allowing the mobile telephone to be synchronized selectively with a base station of the GSM network or with a base station of the UMTS network.

In a preferred embodiment of the invention, the synchronization module 10 includes a first counter 12 coupled to a first digital clock 14, and a second counter 16 coupled to a second digital clock 18. The first digital clock 14 is synchronized with the GSM network whereas the second digital clock 18 is synchronized with the UMTS network.

The synchronization module 10 further includes a control buffer register 19 coupled to each of the counter 12 and 16.

Figure 2:
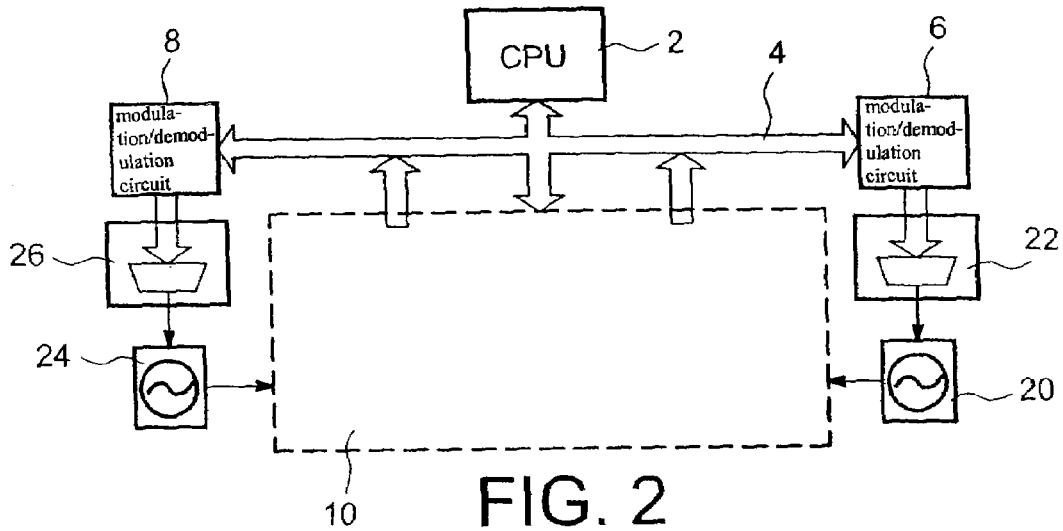
FIG. 2 represents schematically a second embodiment of a synchronization module implemented on the dual-mode terminal.

In a second embodiment illustrated in FIG. 2, the mobile telephone comprises a first analog clock 20 actuated and coupled to the first modulation/demodulation circuit 6 through a first digital-analog converter (CNA) 22, and a second analog clock 24 actuated and coupled to the second modulation/demodulation circuit 8 through a second digital-analog converter (CNA) 26.

As described above, at a given moment, one of the modulation/demodulation circuits 6 or 8 is active and the other is inactive. Consequently, at that moment, solely communication with the network associated with the active modulation/demodulation circuit (GSM or UMTS) is possible, while the inactive modulation/demodulation circuit can only perform measurements on neighboring cells belonging to the other network (GSM or UMTS).

However, a condition for ensuring frequency synchronization with the neighboring base station to be as precise as possible is exactly that the central unit 2 be able to read regularly information on the downlink channels that the mobile is listening.

In order to accomplish this synchronization, the method according to the invention includes the following steps:

measuring a first frequency difference between the active modulation/demodulation circuit and the corresponding radio access network (GSM or UMTS), estimating a second frequency difference between the clocks of the base stations of the GSM and UMTS networks, calculating a third frequency difference between the passive modulation/demodulation circuit and the passive access network according to the first and second frequency differences, using this third frequency difference to synchronize the terminal with the passive network.

Once this synchronization is accomplished, it is possible to evaluate the quality of the communication over the passive network and compare the measured quality of the communication with the current communication quality. If the measured quality of communication is better than the quality of the communication over the active network used by the terminal, the central unit 2 automatically switches the link to the radio access network that has been passive.

In operation, the counters 12 and 16 are initialized and then activated by a command generated by the central unit 2, and then stopped by this central unit 2. The value of the counter 12 is then read and stored in a GSM_counter memory while that of the counter 18 is then read and stored in a UMTS_counter memory.

If for example the modulation/demodulation circuit 8 of UMTS is the one that is active, and if the relative frequency error between the 19.2 MHz clock 18 (alternatively 24) and the clock of the base station of the current cell in the UMTS network NET_clock is defined by $\Delta F_U$, the frequency error between the clock of the modulation/demodulation circuit 6 and the clock of the current base station denoted as NET_clock is calculated by the equation:

$$\frac{\text{GSM\_clock}}{\text{NET\_clock}} = \frac{\text{GSM\_counter}}{\text{UMTS\_counter}} \times \frac{\text{UMTS\_clock\_ideal} + \Delta F_U}{\text{UMTS\_clock\_ideal}} \quad [1]$$

where UMTS_clock_ideal=19.2 MHz

If on the contrary, the modulation/demodulation circuit 6 of GSM is the one that is active, and if the relative frequency error between the 13 MHz clock 14 (alternatively 20) and the clock of the base station of the current cell in the GSM network NET_clock is defined by $\Delta F_G$, the frequency error between the clock of the modulation/demodulation circuit 8 and the clock of the current base station denoted as NET_clock is calculated by the equation:

$$\frac{\text{UMTS\_clock}}{\text{NET\_clock}} = \frac{\text{UMTS\_counter}}{\text{GSM\_counter}} \times \frac{\text{GSM\_clock\_ideal} + \Delta F_G}{\text{GSM\_clock\_ideal}} \quad [2]$$

where GSM_clock_ideal=13 MHz.

The equations [1] and [2] thus make it possible to deduce the temporal offset between the base station of the active network and the passive modulation/demodulation circuit. Knowing the temporal offset between the base stations of the two radio access networks, the offset between the base station of the passive network and the corresponding modulation/demodulation circuit is deduced.

Estimating the Duration of Calibration Time

Figure 3:
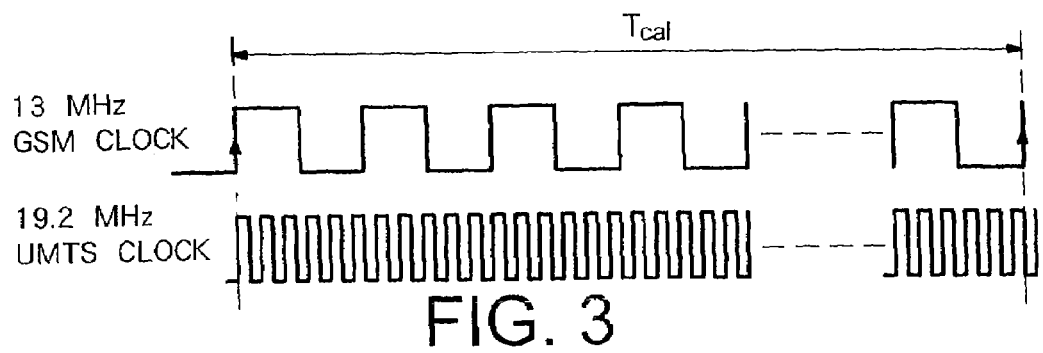
FIG. 3 represents a timing chart illustrating the operation of the counter implemented on the synchronization module of FIGS. 1 and 2.

FIG. 3 illustrates the method used for estimating the duration of calibration.

The period $T_{cal}$ during which the two counters are active is estimated by the central unit 2 with the desired accuracy $\Delta F$. This estimation is accomplished, assuming the slower 13 MHz clock to be the "master" clock and the faster 19.2 MHz clock to be the "slave" clock.

Let the maximum possible time drift during the calibration period $T_{cal}$ be represented by $\Delta T_{max}$, the 19.2 MHz clock starts counting at the rising edge of the first pulse of the 13 MHz clock and stops at the rising edge of the last pulse as illustrated in FIG. 3. These parameters satisfy the following equation:

$$\Delta T_{\max} = \Delta F \times T_{\text{cal}} \Rightarrow T_{\text{cal}} = \frac{\Delta T_{\max}}{\Delta F} \quad [3]$$

Given that the resolution of the counters is equal to the period of the faster clock, that is the one at 19.2 MHz, the maximum time drift that may be tolerated is $\Delta T_{max}$=1/19.2 MHz.

Typically, setting a margin of one supplementary clock period, then the maximum time drift is $\Delta T_{max}$=2/19.2 MHz.

Finally, according to the technical specifications of UMTS and GSM, the frequency accuracy $\Delta F$ should be within 0.1 ppm. Consequently, the calibration time may be estimated from the expression:

$$T_{\text{cal}} = \frac{2/19.2}{0.1} = 1.04 \ s \quad [4]$$

In other words, the counters 12 and 16 should be active for a period of 13.52 million cycles of the 13 MHz clock to ensure a frequency accuracy of 0.1 ppm.

Counter Size

Sizes of the counters are selected according to the time period during which calibration is performed. Thus, in the above example, the GSM counter 12 should be able to count 13.52 million cycles of the 13 MHz clock, which is possible with a counter of 24 bits. Similarly, the UMTS 16 counter should be able to count 19.968 million cycles of the 19.2 MHz clock for a period of 1.04 s, which is possible with a counter of 25 bits.

Cycle for Performing Calibration

The process of calibration should take place in advance, before the inactive modulation/demodulation circuit takes measurements on neighboring cells. In the above example, calibration should be performed at least 1.04 s before measurements on neighboring cells take place.

What is claimed is:

1. A multimode communication terminal comprising
    a first modulation/demodulation circuit adapted to communicate with a first radio access network;
    at least a second modulation/demodulation circuit adapted to communicate with a second radio access network different from the first radio network; and
    a synchronization module comprising means for determining a frequency difference between the first modulation/demodulation circuit and the first radio access network and means for synchronizing the second modulation/demodulation circuit with the second radio access network so as to allow said terminal to compare permanently transmission qualities over the first and second radio access networks.

2. The multimode communication terminal according to claim 1, further comprising a central unit designed to select the radio access network presenting the better communication quality.

3. The multimode communication terminal according to claim 2, wherein the synchronization module comprises a first counter designed to count pulses of a clock associated with the first modulation/demodulation circuit and a second counter designed to count pulses of a clock associated with the second modulation/demodulation circuit.

4. The multimode communication terminal according to claim 1, wherein the synchronization module determines the frequency difference between one of the two modulation/demodulation circuits and the radio access network corresponding to that circuit and calculates the frequency difference between the two modulation/demodulation circuits according to the offset determined.

5. The multimode communication terminal according to claim 2, wherein the synchronization module determines the frequency difference between one of the two modulation/demodulation circuits and the radio access network corresponding to that circuit and calculates the frequency difference between the two modulation/demodulation circuits according to the offset determined.

6. The multimode communication terminal according to claim 3, wherein the synchronization module determines the frequency difference between one of the two modulation/demodulation circuits and the radio access network corresponding to that circuit and calculates the frequency difference between the two modulation/demodulation circuits according to the offset determined.

7. The multimode communication terminal according to claim 4, further comprising a first digital clock coupled to the first counter and a second digital clock coupled to the second counter.

8. The multimode communication terminal according to claim 5, further comprising a first digital clock coupled to the first counter and a second digital clock coupled to the second counter.

9. The multimode communication terminal according to claim 6, further comprising a first digital clock coupled to the first counter and a second digital clock coupled to the second counter.

10. The multimode communication terminal according to claim 4, further comprising a first analog clock actuated and coupled to the first modulation/demodulation circuit through a first CNA and a second analog clock actuated and coupled to the second modulation/demodulation circuit through a second CNA.

11. The multimode communication terminal according to claim 5, further comprising a first analog clock actuated and coupled to the first modulation/demodulation circuit through a first CNA and a second analog clock actuated and coupled to the second modulation/demodulation circuit through a second CNA.

12. The multimode communication terminal according to claim 6, further comprising a first analog clock actuated and coupled to the first modulation/demodulation circuit through a first CNA and a second analog clock actuated and coupled to the second modulation/demodulation circuit through a second CNA.

13. The multimode communication terminal according to claim 1, wherein the first radio access network is the GSM access network and the second radio access network is the UMTS access network.

14. The multimode communication terminal according to claim 2, wherein the first radio access network is the GSM access network and the second radio access network is the UMTS access network.

15. The multimode communication terminal according to claim 3, wherein the first radio access network is the GSM access network and the second radio access network is the UMTS access network.

16. The multimode communication terminal according to claim 4, wherein the first radio access network is the GSM access network and the second radio access network is the UMTS access network.

17. The multimode communication terminal according to claim 5, wherein the first radio access network is the GSM access network and the second radio access network is the UMTS access network.

18. The multimode communication terminal according to claim 6, wherein the first radio access network is the GSM access network and the second radio access network is the UMTS access network.

19. A method of evaluating transmission quality of a multimode terminal via at least two different radio access network, that is a first active radio access network and a second passive radio access network, wherein the method comprises the steps of: measuring a first frequency difference between the terminal and the active radio access network,
    estimating a second frequency difference between the active radio access network and the passive access network,
    calculating a third frequency difference between said terminal and the passive access network according to the first and second frequency differences,
    using this third frequency difference to synchronize the terminal with the passive access network,
    evaluating the quality of the communication over the passive network,
    comparing the measured quality of the communication over the passive network with the communication quality over the active access network, and
    switching to the passive radio access network if this network presents a better communication quality than the active access network.

20. The method according to claim 19, wherein the first radio access network is the GSM access network and the second radio access network is the UMTS access network.

21. The method according to claim 19, wherein the first radio access network is the UMTS access network and the second radio access network is the GSM access network.

* * * * *